United States Patent
Park et al.

(10) Patent No.: US 11,552,360 B2
(45) Date of Patent: Jan. 10, 2023

(54) CARTRIDGE AND BATTERY MODULE COMPRISING SAME

(71) Applicant: LG CHEM, LTD., Seoul (KR)

(72) Inventors: Won-Kyoung Park, Daejeon (KR);
Seong-Tae Kim, Daejeon (KR);
Jun-Kyu Park, Daejeon (KR);
Jun-Yeob Seong, Daejeon (KR);
Gyo-Eun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 51 days.

(21) Appl. No.: 16/476,829

(22) PCT Filed: Feb. 28, 2018

(86) PCT No.: PCT/KR2018/002485
§ 371 (c)(1),
(2) Date: Jul. 9, 2019

(87) PCT Pub. No.: WO2018/160012
PCT Pub. Date: Sep. 7, 2018

(65) Prior Publication Data
US 2020/0006723 A1 Jan. 2, 2020

(30) Foreign Application Priority Data
Mar. 3, 2017 (KR) .................. 10-2017-0027931

(51) Int. Cl.
*H01M 50/342* (2021.01)
*H01M 50/30* (2021.01)
*H01M 50/20* (2021.01)

(52) U.S. Cl.
CPC ....... *H01M 50/20* (2021.01); *H01M 50/3425* (2021.01)

(58) Field of Classification Search
CPC ............. H01M 50/20; H01M 50/3425; H01M 50/30; H01M 50/209; H01M 50/394; Y02E 60/10
(Continued)

(56) References Cited

U.S. PATENT DOCUMENTS

2004/0175609 A1 9/2004 Yageta
2008/0193838 A1 8/2008 Oh
(Continued)

FOREIGN PATENT DOCUMENTS

CN 103531727 A 1/2014
EP 2 980 882 A1 2/2016
(Continued)

OTHER PUBLICATIONS

International Search Report (PCT/ISA/210) issued in PCT/KR2018/002485, dated Oct. 16, 2018.

*Primary Examiner* — Christian Roldan
(74) *Attorney, Agent, or Firm* — Birch, Stewart, Kolasch & Birch, LLP

(57) ABSTRACT

A cartridge including a body having a first surface and a second surface opposite the first surface, the first surface being configured to seat at least a portion of a first battery cell, and a first supporting pattern disposed in a first area along an edge of the first surface of the body and corresponding to a gas pocket of the first battery cell is provided. A battery module having a plurality of such cartridges is also provided.

10 Claims, 11 Drawing Sheets

(58) Field of Classification Search
USPC .......................................................... 429/56
See application file for complete search history.

(56) References Cited

U.S. PATENT DOCUMENTS

| | | | | |
|---|---|---|---|---|
| 2010/0112436 | A1* | 5/2010 | Mizuta | H01M 50/211 |
| | | | | 429/185 |
| 2011/0003185 | A1* | 1/2011 | Kritzer | H01M 50/20 |
| | | | | 429/56 |
| 2012/0107676 | A1* | 5/2012 | Han | H01M 50/172 |
| | | | | 429/179 |
| 2014/0011056 | A1 | 1/2014 | Adachi | |
| 2014/0050953 | A1* | 2/2014 | Yoon | H01M 10/613 |
| | | | | 429/82 |
| 2014/0212710 | A1* | 7/2014 | Min | H01M 50/105 |
| | | | | 429/61 |
| 2015/0086817 | A1* | 3/2015 | Chung | H01M 50/3425 |
| | | | | 429/56 |
| 2016/0268658 | A1* | 9/2016 | Kong | H01M 10/613 |
| 2017/0033419 | A1 | 2/2017 | Eom et al. | |
| 2018/0212267 | A1 | 7/2018 | Kritzer et al. | |

FOREIGN PATENT DOCUMENTS

| | | | |
|---|---|---|---|
| JP | 2003-168410 A | | 6/2003 |
| JP | 2004-265762 A | | 9/2004 |
| JP | 2007-141778 A | | 6/2007 |
| JP | 2007141778 | * | 6/2007 |
| JP | 2009-21067 A | | 1/2009 |
| JP | 2010-33789 A | | 2/2010 |
| KR | 10-2006-0102207 A | | 9/2006 |
| KR | 10-2011-0075789 A | | 7/2011 |
| KR | 10-1275487 B1 | | 6/2013 |
| KR | 10-2014-0076857 A | | 6/2014 |
| KR | 10-2014-0130859 A | | 11/2014 |
| KR | 10-2015-0118375 A | | 10/2015 |
| KR | 10-2016-0046597 A | | 4/2016 |
| KR | 10-2016-0075468 A | | 6/2016 |
| KR | 10-1671483 B1 | | 11/2016 |
| WO | WO 2012/044065 A2 | | 4/2012 |

* cited by examiner

CARTRIDGE AND BATTERY MODULE COMPRISING SAME

TECHNICAL FIELD

The present disclosure relates to a cartridge used to stably stack battery cells and a battery module including the same.

The present application claims priority to Korean Patent Application No. 10-2017-0027931 filed in the Republic of Korea on Mar. 3, 2017, the disclosure of which is incorporated herein by reference.

BACKGROUND ART

Recently, there is dramatically growing demand for portable electronic products such as laptop computers, video cameras and mobile phones, and with the extensive development of electric vehicles, accumulators for energy storage, robots and satellites, many studies are being made on high performance secondary batteries that can be recharged repeatedly.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages of free charging/discharging, low self-discharging and high energy density.

When constructing a battery pack by connecting a plurality of battery cells in series/in parallel, it is general to manufacture a battery pack by manufacturing a battery module including at least one battery cell first, and then connecting two or more battery modules and other components.

The battery cell may generate gas as a result of decomposition of an electrolyte solution therein due to side reactions caused by repeated charging/discharging, temperature changes and external impacts. In this instance, a phenomenon in which the shape of the battery cell is deformed by the generated gas is referred to as a swelling phenomenon.

The easiest possible way to suppress the swelling phenomenon is to cool the battery module. It is because when the battery module is cooled, less gas is produced from the individual battery cell included therein. However, for cooling of the battery module, a special structure and/or cooling control method is necessarily required, which acts as a significant limitation in manufacturing the battery module.

Additionally, even though the battery module is cooled, it is only possible to lower the speed of the swelling phenomenon, and it is impossible to completely prevent the swelling phenomenon. Accordingly, under the premise that a swelling phenomenon occurs, there is a need for an approach to suppress damage in the battery module or the individual battery cell included in the battery module from the swelling phenomenon.

DISCLOSURE

Technical Problem

The present disclosure is designed to solve the above-described problem, and therefore, the present disclosure is directed to providing a cartridge with a structure for reducing the risk of gas trapped in a damaged gas pocket leaking out of a battery module in the event that any of gas pockets of each battery cell included in the battery) module is damaged, and a battery module including the same.

The present disclosure is further directed to providing a cartridge with a structure for gas balancing of battery cells stacked in a battery module and a battery module including the same.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

Various embodiments of the present disclosure for achieving the above-described object are as below.

A cartridge according to an aspect of the present disclosure includes a body having a first surface and a second surface opposite the first surface, the first surface being configured to seat at least a portion of a first battery cell, and a first supporting pattern disposed in a first area along an edge of the first surface of the body and corresponding to a gas pocket of the first battery cell.

The first supporting pattern may include a plurality of first supporting ribs, each first supporting rib having a wall shape that protrudes from the first surface of the body.

The second surface may be configured to seat at least a portion of a second battery cell, and the cartridge may further include a second supporting pattern formed in a second area along an edge of the second surface of the body and corresponding to a gas pocket of the second battery cell.

The second supporting pattern may include a plurality of second supporting ribs, each second supporting rib having a wall shape that protrudes from the second surface of the body.

The cartridge may further include an adhesive layer coated on the first supporting ribs of the first supporting pattern and configured to adhere at least a portion of the gas pocket of the first battery cell to the first supporting ribs of the first supporting pattern.

At least one gas room may be formed in the first area by the plurality of supporting ribs. Each gas room may be configured to store gas leaking out of the gas pocket of the first battery cell.

The cartridge may further include a needle with a tip facing from the first surface toward the first battery cell in an area where the first supporting pattern is disposed.

The body may include at least one gas balancing passage, and each gas balancing passage may run in a thickness-wise direction of the body from a point in the first area where the first supporting pattern is disposed.

A battery module according to another aspect of the present disclosure includes a plurality of stacked cartridges, and a plurality of first battery cells seated in each cartridge. In this case, each cartridge includes a body having a first surface and a second surface opposite the first surface, the first surface on which one first battery cell of the plurality of first battery cells is seated at least in part, and a first supporting pattern disposed in a first area corresponding to a gas pocket of the one first battery cell on the first surface of the body.

The first supporting pattern may include a plurality of first supporting ribs, each first supporting rib having a wall shape that protrudes from the first surface of the body.

At least one gas room may be formed in the first area by the plurality of first supporting ribs. Each gas room may store gas leaking out of the gas pocket of the one first battery cell.

The body may include at least one gas balancing passage, and each gas balancing passage may run in a thickness-wise direction of the body from a point in the first area where the first supporting pattern is disposed.

The battery module may include at least one second battery cell, and at least one cartridge of the plurality of cartridges may include a second supporting pattern formed in a second area along an edge of the second surface of the body and corresponding to a gas pocket of the at least one second battery cell.

The second supporting pattern may include a plurality of second supporting ribs, each second supporting rib having a wall shape that protrudes from the second surface of the body.

Advantageous Effects

According to at least one of the embodiments of the present disclosure, there is provided a cartridge with a structure for reducing the risk of gas trapped in a damaged gas pocket leaking out of a battery module in the event that any of gas pockets of each battery cell included in the battery module is damaged, and a battery module including the same.

Additionally, there is provided a cartridge with a structure for gas balancing of battery cells stacked in a battery module and a battery module including the same.

Particularly, when any of gas pockets of each battery cell expands too much, safe breakage of the expanded gas pocket is induced and gas from the broken gas pocket is distributed to an allowable space provided by the cartridge, to suppress breakage of the individual battery cell (for example, breakage of a sealing part, etc.).

The effects of the present disclosure are not limited to the above-mentioned effects, and other effects not mentioned herein will be clearly understood by those skilled in the art from the disclosure of the appended claims.

BRIEF DESCRIPTION OF THE DRAWINGS

The accompanying drawings illustrate a preferred embodiment of the present disclosure and together with the following detailed description of the present disclosure, serve to provide further understanding of the technical aspects of the present disclosure, and therefore, the present disclosure should not be construed as being limited to the drawings.

MODE FOR CARRYING OUT THE INVENTION

Figure 1:
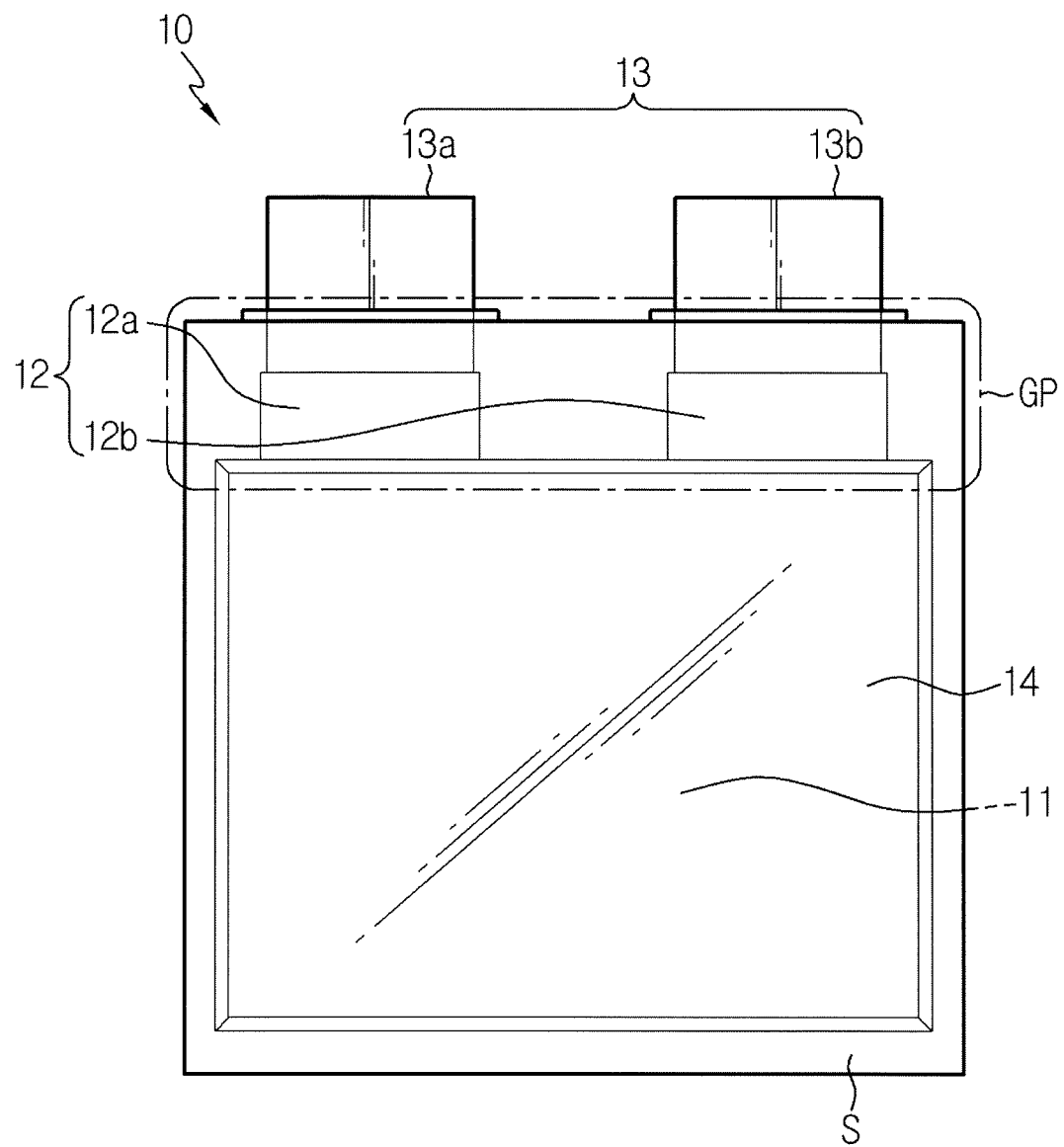
FIG. 1 is a schematic diagram showing the structure of a battery cell according to an embodiment of the present disclosure.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could be made thereto at the time the application was filed.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Unless the context clearly indicates otherwise, it will be understood that the term "comprises" or "includes" when used in this specification, specifies the presence of stated elements, but does not preclude the presence or addition of one or more other elements. Additionally, the term <control unit> as used herein refers to a processing unit of at least one function or operation, and this may be implemented by hardware or software alone or in combination.

In addition, throughout the specification, it will be further understood that when an element is referred to as being "connected to" another element, it can be directly connected to the other element or intervening elements may be present.

Hereinafter, a battery cell, a cartridge and a battery module according to embodiments of the present disclosure will be described.

Figure 2:
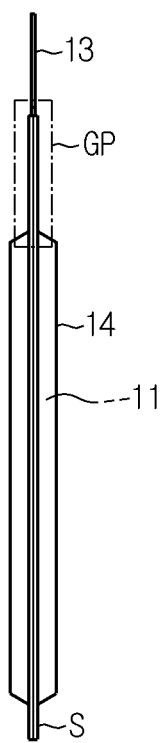
FIG. 2 is a diagram showing the battery cell of FIG. 1 when viewed from the side.
Figure 3:
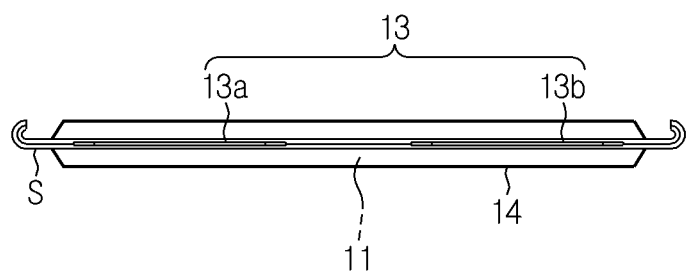
FIG. 3 is a diagram showing the battery cell of FIG. 1 when viewed from the front.

FIG. 1 is a schematic diagram showing the structure of the battery cell 10 according to an embodiment of the present disclosure, FIG. 2 is a diagram showing the battery cell 10 of FIG. 1 when viewed from the side, and FIG. 3 is a diagram showing the battery cell 10 of FIG. 1 when viewed from the front.

First, referring to FIG. 1, the battery cell 10 basically includes an electrode assembly 11, an electrode tab 12, an electrode lead 13 and a case 14.

The case 14 provides a space in which the electrode assembly 11 and an electrolyte solution are received, and is sealed through a sealing process. In this instance, the sealing process is a process that mechanically couples the edge area of the case 14 through heat fusion to prevent the electrolyte solution injected into the case 14 from leaking out of the case 14 for impregnation of the case 14. By this sealing process, a sealing part S may be formed in the edge area of the case 14.

The electrode assembly 11 is such that at least one positive electrode plate, at least one negative electrode plate and at least one separator are stacked or folded in a preset shape. One end of each of two electrode tabs 12, i.e., a positive electrode tab 12a and a negative electrode tab 12b, protruding from the electrode assembly 11 is electrically connected to two electrode leads 13, i.e., a positive electrode lead 13a and a negative electrode lead 13b inside of the case 14, respectively. The other end of the two electrode leads 13 extends out from the case 14, and in this case, at least a portion of the two electrode leads 13 may be interposed between the top and bottom of the case 14. In this instance, as shown in FIG. 1, in the internal space of the case 14, a partial space between the electrode assembly 11 and the sealing part S may be referred to as a gas pocket GP. Gas produced as a result of charging/discharging of the battery cell 10 may be trapped by the gas pocket GP.

Referring to FIG. 2, when viewed from the outside, the battery cell 10 may have a step. That is, while a swelling phenomenon is less than a predetermined level, a part corresponding to the electrode assembly 11 is thickest, a part corresponding to the gas pocket GP is thinner, and the electrode lead 13 is thinnest. On the contrary, when a swelling phenomenon exceeds a predetermined level, a part corresponding to the gas pocket GP may be thicker than a part corresponding to the electrode assembly 11.

Referring to FIG. 3 together with FIG. 1, each of the two sealing parts S disposed on two side surfaces of the electrode assembly 11 on the basis of FIG. 1 may be folded up or down with respect to the electrode assembly 11 in a predetermined shape. Accordingly, it is possible to improve the energy density of the battery cell 10.

Figure 4:
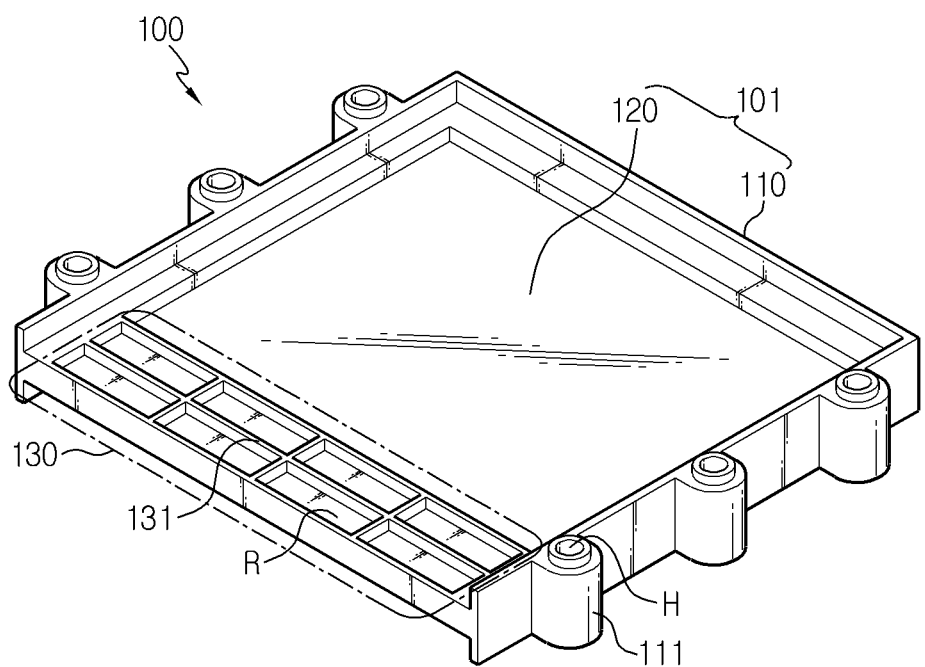
FIG. 4 is a diagram showing the structure of a cartridge according to an embodiment of the present disclosure.
Figure 5:
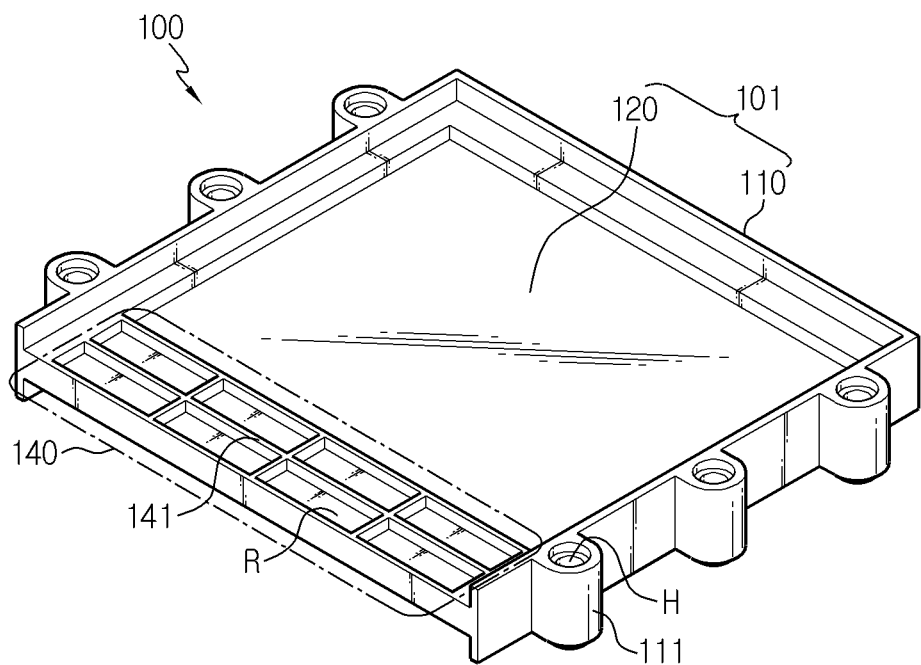
FIG. 5 is a diagram showing the cartridge of FIG. 4 when viewed from the opposite side.

FIG. 4 is a diagram showing the structure of the cartridge 100 according to an embodiment of the present disclosure, and FIG. 5 is a diagram showing the cartridge 100 of FIG. 4 when viewed from the opposite side.

First, referring to FIG. 4, the cartridge 100 provides a structure in which at least one battery cell 10 with the structure shown in FIG. 1 may be seated. The cartridge 100 includes a body 101 and a first supporting pattern 130.

The body 101 has a frame or plate shape that provides a space in which the battery cell 10 can be seated. Preferably, the body 101 may include a side part 110 and a base part 120. The side part 110 may be mechanically connected to the base part 120, surrounding the edges of the base part 120 at least in part. Preferably, the side part 110 may have at least one flange 111, and the flange 111 may have a protrusion and a groove respectively on top and bottom. The protrusion is connected with a groove provided in a flange of other cartridge 100. The groove is connected with a protrusion provided in a flange of another cartridge 100. Each flange 111 has a coupling hole H, so that when a plurality of cartridges 100 is stacked in a sequential order, bolts are inserted into the coupling holes H to mechanically couple the plurality of cartridges 100.

The battery cell 10 may be seated in an internal space provided on the basis of the connected part of the base part 120 and the side part 110 at least in part. For example, when the body 101 is in a frame shape, the sealing part S of the battery cell 10, i.e., the edge area may be seated in the body 101. Because a predetermined area of the base part 120 has an open shape, the body 101 in a frame shape is effective in heat radiation of the battery cell 10. As another example, when the body 101 is in a plate shape, a flat part corresponding to the upper or lower part of the battery cell 10 may be seated in the body 101 in whole.

The body 101 is configured to support at least a portion of the battery cell 10 to guide the sequential stack with other battery cell 10 while reducing the movement of the battery cell 10 in the battery module 200.

The first supporting pattern 130 is disposed on one surface (hereinafter referred to as a 'first surface') of the two facing surfaces of the body 101. Specifically, the first supporting pattern 130 may be disposed in a first area corresponding to the gas pocket GP of the battery cell 10 (hereinafter referred to as a 'first battery cell') supported at least in part by the first surface of the body 101. The first supporting pattern 130 may be disposed closer to the first battery cell 10, in particular, the gas pocket GP of the first battery cell than the base part 120, and come into contact with the gas pocket GP. For example, when an amount of gas trapped in the gas pocket GP of the first battery cell 10 is less than a predetermined level, the gas pocket GP and the first supporting pattern 130 remain apart, and when an amount of gas trapped in the gas pocket GP reaches the predetermined level, by expansion of the gas pocket GP, the first supporting pattern 130 may come into contact with the gas pocket GP of the first battery cell 10 at least in part and support it.

The first supporting pattern 130 may include at least one supporting rib 131. Each supporting rib has a wall shape, and protrudes outwards as much as a predetermined length. When the first supporting pattern 130 includes a plurality of supporting ribs 131, any one of the plurality of supporting ribs 131 and at least one of the remaining supporting ribs may extend in different directions. Preferably, the protruding heights of all the supporting ribs included in the first supporting pattern 130 are equal or have a difference within a predetermined error range.

At least one gas room R may be formed in the first area by the plurality of supporting ribs 131 included in the first supporting pattern 130. Specifically, at least one gas room R may be formed in the first area by intersection or connection of each supporting rib 131 and at least one of the remaining supporting ribs. The side surface of each gas room R formed on the first surface is defined by the supporting rib 131, and one of the upper and lower surfaces is defined by the base part 120 and the other is defined by the gas pocket GP. That is, the gas room R formed on the first surface may be a space hermetically sealed by each of the supporting rib 131, the base part 120 and the gas pocket GP. Accordingly, gas leaking out of the gas pocket GP may be stored in the gas room R formed on the first surface. For example, referring to FIG. 4, it can be seen that a total of eight gas rooms R may be formed on the first surface of the cartridge 100 by three supporting ribs extending along the widthwise direction of the body 101 and five supporting ribs extending along the lengthwise direction of the body 101.

In some cases, the cartridge 100 may further include a first adhesive layer. The first adhesive layer may be coated onto at least the front end part of the first supporting pattern 130. As described above, when the gas pocket GP of the first battery cell 10 expands toward the first supporting pattern 130 more than a predetermined level, the gas pocket GP of the first battery cell 10 may be joined to the first supporting pattern 130 through the first adhesive layer. That is, the first adhesive layer provides the bond strength to prevent the gas pocket GP of the first battery cell 10 and the first supporting pattern 130 from being easily separated from each other. Accordingly, it is possible to prevent gas in the gas pocket GP of the first battery cell 10 from leaking into the gas room R and then leaking out of the gas room R again.

Subsequently, referring to FIG. 5, the cartridge 100 may further include a second supporting pattern 140. The second supporting pattern 140 is disposed on the other surface (hereinafter referred to as a 'second surface') of the two facing surfaces of the body 101. Specifically, the second supporting pattern 140 may be disposed in a second area corresponding to a gas pocket GP of another battery cell 10 (hereinafter referred to as a 'second battery cell') supported at least in part by the second surface of the body 101. The second supporting pattern 140 may be disposed closer to the gas pocket GP of the second battery cell 10 than the base part 120, and come into contact with the gas pocket GP. For example, when an amount of gas trapped in the gas pocket GP of the second battery cell 10 is less than a predetermined level, the gas pocket GP of the second battery cell 10 and the second supporting pattern 140 remain apart, and when an amount of gas trapped in the gas pocket GP of the second battery cell 10 reaches the predetermined level, by expansion of the gas pocket GP, the second supporting pattern 140 may come into contact with the gas pocket GP of the second battery cell 10 at least in part and support it.

In the same way as the first supporting pattern 130, the second supporting pattern 140 may also include at least one supporting rib 141. Each supporting rib 141 has a wall shape, and protrudes outwards as much as a predetermined length. When the second supporting pattern 140 includes a plurality of supporting ribs 141, any one of the plurality of supporting ribs 141 and at least one of the remaining supporting ribs may extend in different directions. Preferably, the protruding heights of all the supporting ribs included in the second supporting pattern 140 are equal or have a difference within a predetermined error range.

At least one gas room R may be formed in the second area by the plurality of supporting ribs 141 included in the second supporting pattern 140. Specifically, at least one gas room R may be also formed in the second area by intersection or connection of each supporting rib 141 and at least one of the remaining supporting ribs. The side surface of each gas room R formed on the second surface is defined by the supporting rib 141, and one of the upper and lower surfaces is defined by the base part 120 and the other is defined by the gas pocket GP. That is, the gas room R formed on the second surface may be a space hermetically sealed by each of the supporting rib 141, the base part 120 and the gas pocket GP. Accordingly, gas leaking out of the gas pocket GP may be stored in the gas room R formed on the second surface. For example, referring to FIG. 5, it can be seen that a total of eight gas rooms R may be formed on the second surface of the cartridge 100 by three supporting ribs extending along the widthwise direction of the body 101 and five supporting ribs extending along the lengthwise direction of the body 101. The gas room R of FIG. 4 and the gas room R of FIG. 5 may be formed at corresponding locations with the base part 120 interposed between.

In some cases, the cartridge 100 may further include a second adhesive layer. The second adhesive layer may be coated onto the front end part of the second supporting pattern 140. As described above, when the gas pocket GP of the second battery cell 10 is expanded toward the second supporting pattern 140 more than a predetermined level, the gas pocket GP may be joined to the second supporting pattern 140 through the second adhesive layer. That is, the second adhesive layer provides the bond strength to prevent the gas pocket GP of the second battery cell 10 and the second supporting pattern 140 from being easily separated from each other. Accordingly, it is possible to prevent gas in the gas pocket GP of the second battery cell 10 from leaking into the gas room R and then leaking out of the gas room R again.

In FIGS. 4 and 5, at least one of the first supporting pattern 130 and the second supporting pattern 140 may be integrally formed with the body 101 through a pressing technique. Of course, at least one of the first supporting pattern 130 and the second supporting pattern 140 and the body 101 may be separately manufactured and mechanically joined through welding.

Additionally, the cartridge 100 including only the first supporting pattern 130 among the first supporting pattern 130 and the second supporting pattern 140 may be referred to as a 'single type cartridge 100', and the cartridge 100 including both the first supporting pattern 130 and the second supporting pattern 140 may be referred to as a 'double type cartridge 100'.

Figure 6:
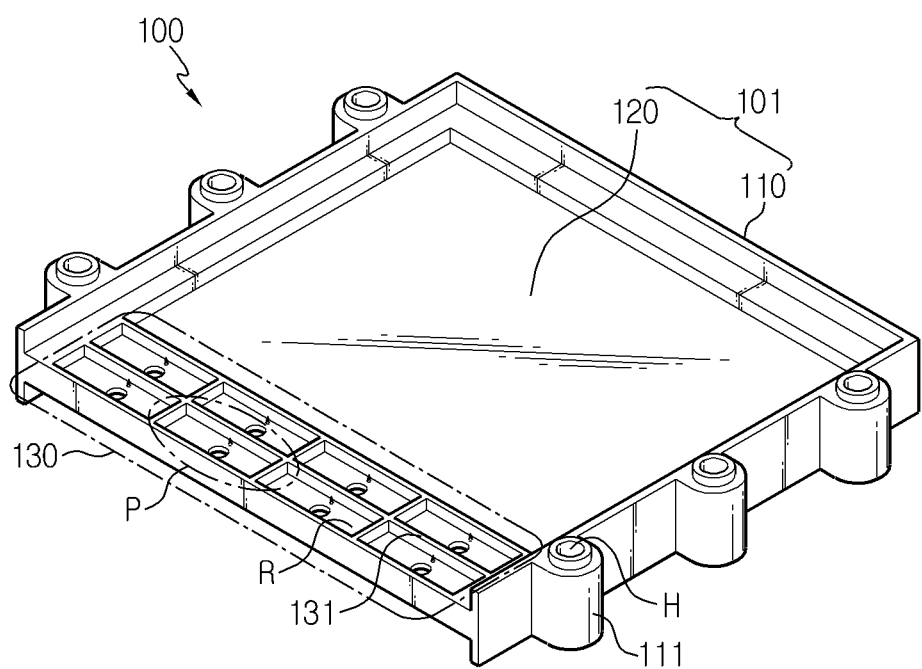
FIG. 6 is a diagram showing the structure of a cartridge according to another embodiment of the present disclosure.
Figure 7:
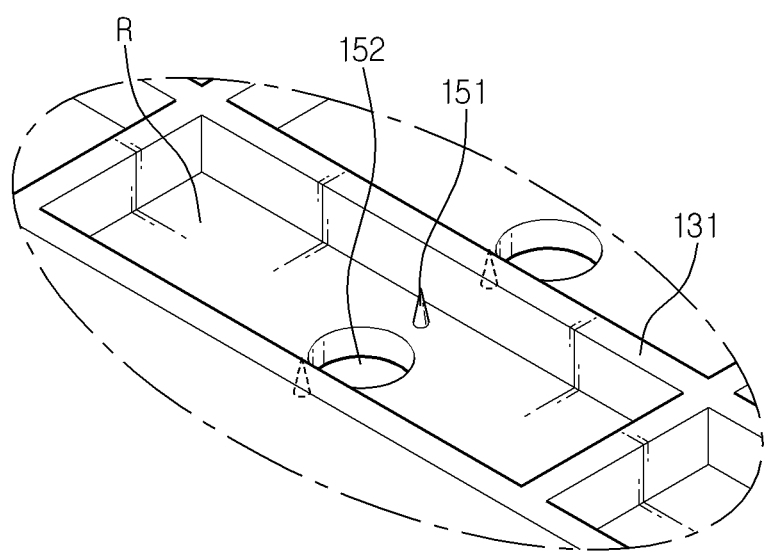
FIG. 7 is an enlarged view of section P in FIG. 6.

FIG. 6 is a diagram showing the structure of the cartridge 100 according to another embodiment of the present disclosure, and FIG. 7 is an enlarged view of section P in FIG. 6.

When comparing with the cartridge 100 of FIG. 4, an only difference is that the cartridge 100 of FIG. 6 further includes at least one of a needle 151 and a gas balancing passage 152. Accordingly, like reference numerals denote like elements, and their detailed description is omitted herein.

Referring to FIGS. 6 and 7, the cartridge 100 may include at least one needle 151. Each needle 151 may be disposed on either the first surface or the second surface, or both. For convenience of description, a description will be provided based on the structure in which the needle 151 and the gas balancing passage 152 are disposed on the first surface.

Each needle 151 may be disposed in the gas room R. For example, the needle 151 may protrude from the surface of the base part 120 or the supporting rib 131, 141 in the gas room R, with the tip facing the gas pocket GP. When the gas pocket GP of the battery cell 10 is expanded more than a predetermined level by gas trapped therein, at least one point of the gas pocket GP is torn by the tip of the needle 151. Accordingly, the size of the gas pocket GP is extended as much as the size of the gas room R, and a portion of gas in the gas pocket GP moves into the gas room R, reducing the pressure in the gas pocket GP. As a result, the pressure in the gas pocket GP is distributed to the gas room R without concentrating on the area having lower bond strength in the sealing part S, reducing damage of the battery cell 10.

Referring to FIGS. 6 and 7, the cartridge 100 may include at least one gas balancing passage 152. Preferably, the gas balancing passage 152 may be formed in at least one corresponding location in the gas room R of the cartridge 100. Each gas balancing passage 152 may be referred to as a part that runs in the thickness-wise direction of the body 101 from at least one point in the area where the supporting patterns 130, 140 are disposed in the entire area of the base part 120.

When the gas room R of the first surface and the gas room R of the second surface have the corresponding locations, the two gas rooms R may be connected to each other through the gas balancing passage 152. Accordingly, through the gas balancing passage 152, gas may be distributed from one gas room R to the other gas room R. For example, when the gas pocket GP of the first battery cell 10 supported by the first surface is torn by its internal pressure or the needle 151, a portion of gas trapped in the gas pocket GP of the first battery cell 10 may move to the gas room R of the first surface, and even to the gas room R of the second surface through the gas balancing passage 152.

Although FIGS. 6 and 7 show that each gas room R has both the needle 151 and the gas balancing passage 152, the scope of the present disclosure is not limited thereto. For example, one gas room R may have the needle 151 alone, another gas room R may have the gas balancing passage 152 alone, still another gas room R may have both the needle 151 and the gas balancing passage 152, and the other gas room R may have neither the needle 151 nor the gas balancing passage 152.

Figure 8:
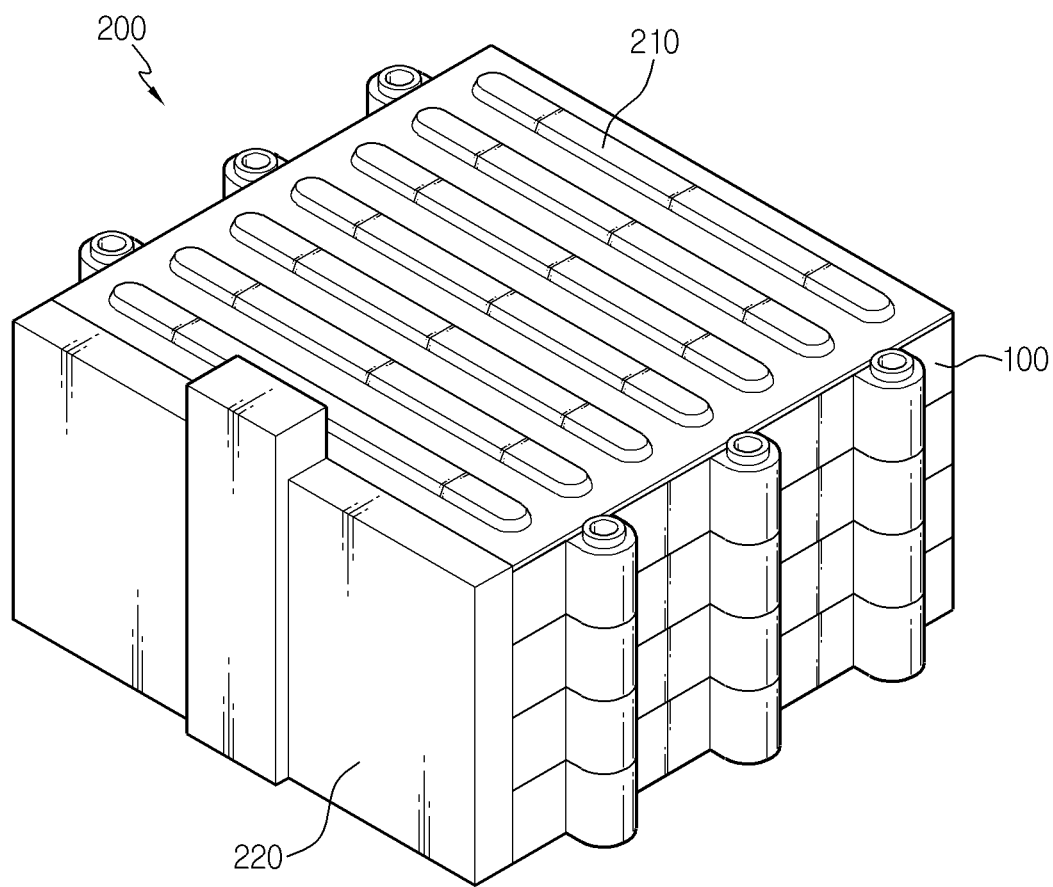
FIG. 8 is a diagram showing a stack structure of a plurality of battery cells by a plurality of cartridges.

FIG. 8 is a diagram showing the stack structure of the plurality of battery cells 10 by the plurality of cartridges 100.

Referring to FIG. 8, among the plurality of cartridges 100 in the battery module 200, the remaining cartridges 100 except two outermost cartridges 100 may be a 'double type cartridge 100'. Additionally, each of the two outermost cartridges 100 in the battery module 200 may be a 'single type cartridge 100'. When n 'double type cartridges 100' are stacked in a sequential order between two 'single type cartridges 100' in the battery module 200, it is obvious to those skilled in the art that the number of battery cells 10 included in the battery module 200 may be 2n+2. Of course, combinations of cartridges 100 in the battery module 200 may be variously changed.

The battery module 200 may include two end plates 210 facing each other with the plurality of cartridges 100 interposed between, and a charge/discharge circuit assembly 220.

The two end plates 210 come into direct/indirect contact with each of the two outermost cartridges 100, and are configured to support and protect the plurality of stacked cartridges 100 from external impacts.

The charge/discharge circuit assembly 220 provides an electrical path to allow the plurality of battery cells 10 seated in the plurality of stacked cartridges 100 to be electrically connected according to a preset method (for example, either in series or in parallel, or both). For example, the charge/discharge circuit assembly 220 includes a plurality of bus bars, and each bus bar is configured to electrically connect the electrode lead 13 of one battery cell 10 to the electrode lead 13 of another battery cell 10, or to electrically connect the electrode lead 13 of one battery cell 10 to an electrode terminal of the battery module 200. Additionally, the charge/discharge circuit assembly 220 may further include a battery management system.

Figure 9:
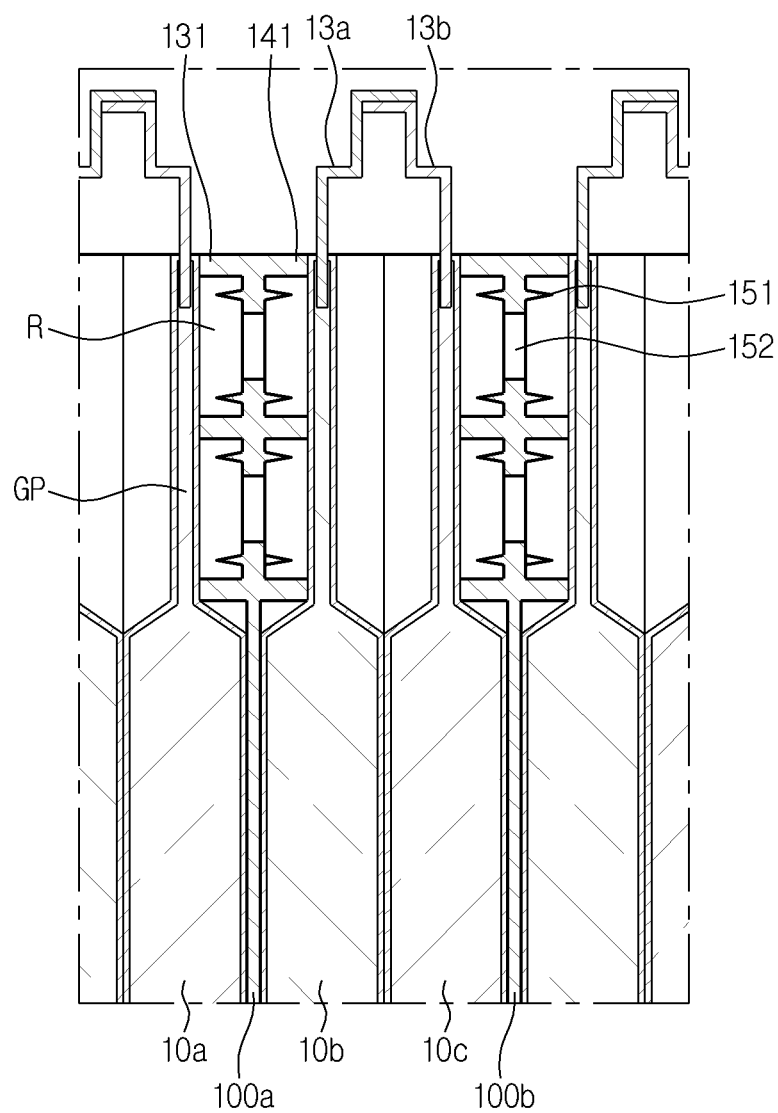
FIG. 9 is a schematic diagram showing a portion of side cross section of a battery module of FIG. 8.
Figure 10:
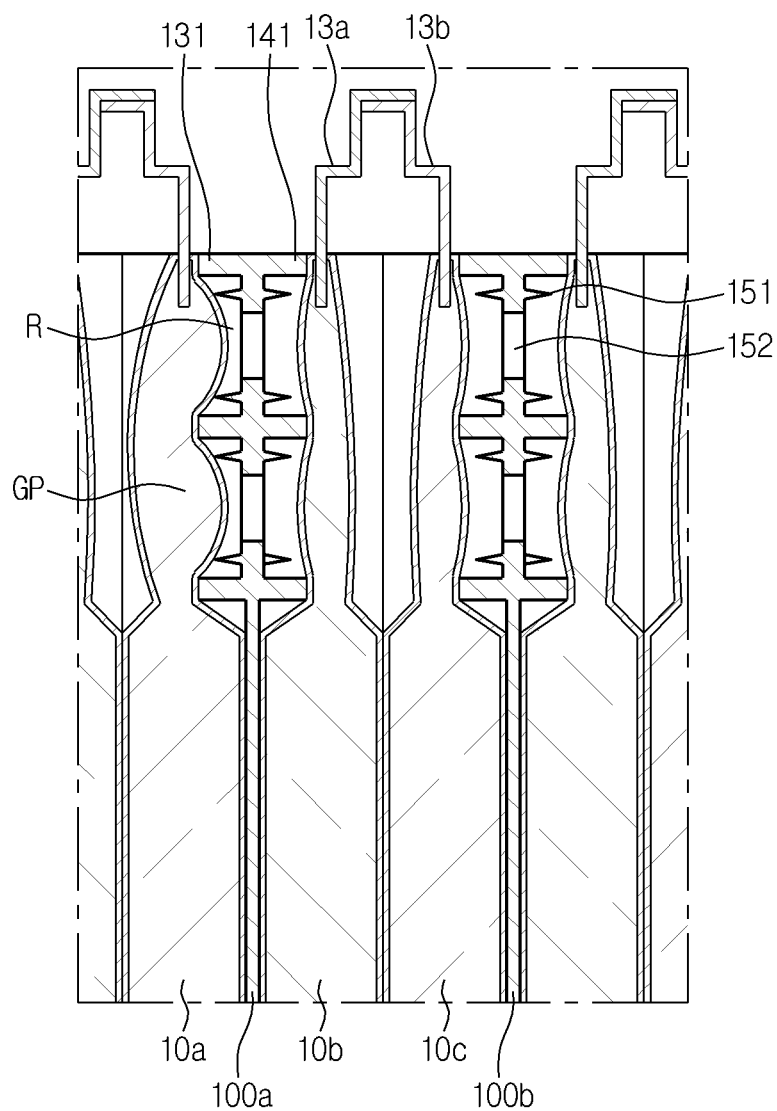
FIG. 10 is a diagram showing a swelling phenomenon occurred in the battery cell of FIG. 9.
Figure 11:
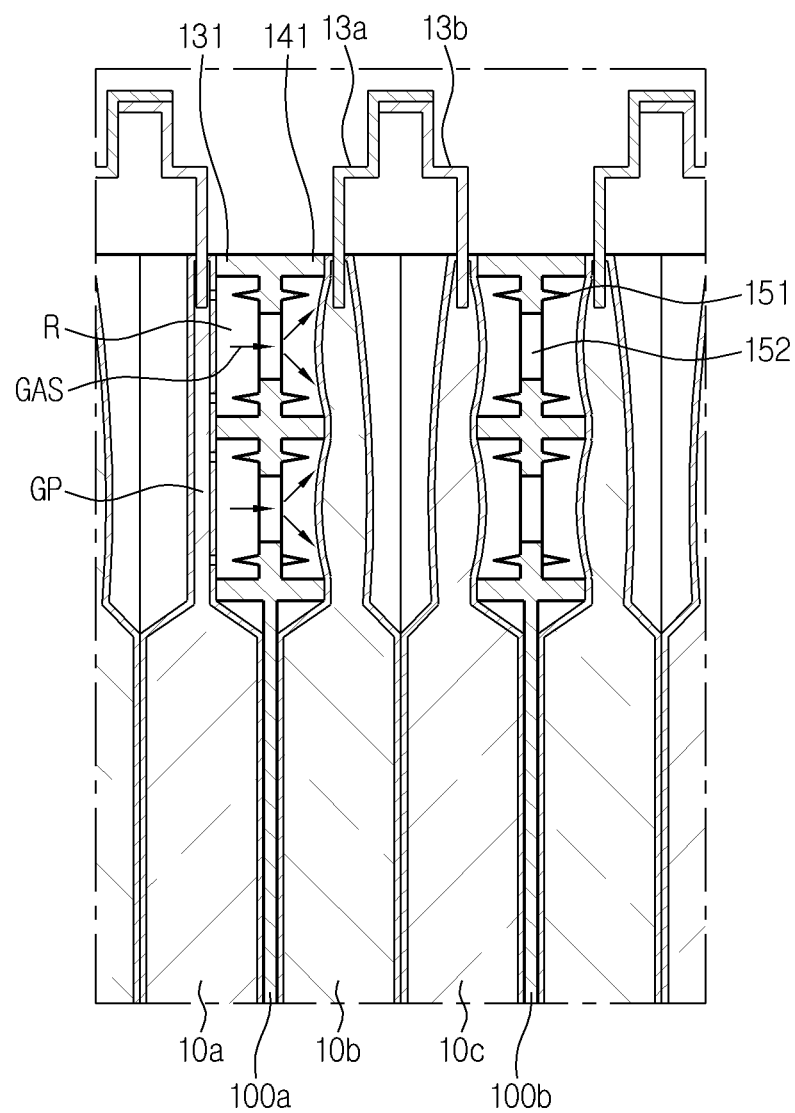
FIG. 11 is a diagram for reference in illustrating gas balancing by the cartridge of FIG. 10.

FIG. 9 is a schematic diagram showing a portion of side cross section of the battery module 200 of FIG. 8, FIG. 10 is a diagram showing a swelling phenomenon occurred in the battery cell 10 of FIG. 9, and FIG. 11 is a diagram for reference in illustrating gas balancing by the cartridge 100 of FIG. 10. For convenience of description, it is assumed that the cartridge 100 of FIG. 6 is a double type cartridge, and each gas room R has two needles 151 and one gas balancing passage 152.

Referring to FIG. 9, each one battery cell 10 is seated on two surfaces of the cartridge 100. When a plurality of cartridges 100 is arranged, one battery cell 10b seated in one cartridge 100a may come into contact with one battery cell 10c seated in another cartridge 100b at least in part. For example, the battery cell 10a and the battery cell 10b may be brought into surface contact directly or indirectly through the cooling plate.

Referring to FIG. 10, it is shown that a swelling phenomenon occurs in at least one battery cell 10a in the battery module 200, and the gas pocket GP of the battery cell 10a is expanded. As the gas pocket GP of the battery cell 10a is expanded, the distance between the gas pocket GP and the needle 151 provided in the cartridge 100a gradually reduces.

When the gas pocket GP of the battery cell 10a is continuously expanded and the surface reaches the needle 151, the gas pocket GP of the battery cell 10a is torn by the needle 151. Accordingly, as indicated by the arrow in FIG. 11, a portion of gas GAS in the gas pocket GP of the battery cell 10a moves to the gas room R defined by the supporting rib 131, and subsequently, is transmitted to another gas room R through the gas balancing passage 152 by the other supporting rib 141.

Although the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

Additionally, many substitutions, modifications and changes may be made to the present disclosure described hereinabove by those skilled in the art without departing from the technical aspects of the present disclosure, and therefore, the present disclosure is not limited to the above-described embodiments and the accompanying drawings, and each embodiment may be selectively combined in part or in whole to allow various modifications.

What is claimed is:

1. A cartridge comprising:
    a body having a first surface and a second surface different from the first surface and opposite the first surface, the first surface being configured to seat at least a portion of a first battery cell; and
    a first supporting pattern disposed in a first area along an edge of the first surface of the body and corresponding to a gas pocket of the first battery cell,
    wherein the first supporting pattern includes a plurality of first supporting ribs, each first supporting rib having a wall shape that protrudes upward from the first surface of the body,
    wherein one first supporting rib intersects another first supporting rib,
    wherein at least one gas room is formed in the first area by the plurality of first supporting ribs and the first surface,
    wherein each gas room is configured to store gas leaking out of the gas pocket of the first battery cell, and
    wherein the gas room has a gas balancing passage extending through the body from the first surface to the second surface.

2. The cartridge according to claim 1, wherein the second surface is configured to seat at least a portion of a second battery cell, and
    wherein the cartridge further comprises a second supporting pattern formed in a second area along an edge of the second surface of the body and corresponding to a gas pocket of the second battery cell.

3. The cartridge according to claim 2, wherein the second supporting pattern includes a plurality of second supporting ribs, each second supporting rib having a wall shape that protrudes downward from the second surface of the body.

4. The cartridge according to claim 1, further comprising:
    an adhesive layer coated on the first supporting ribs of the first supporting pattern and configured to adhere at least a portion of the gas pocket of the first battery cell to the first supporting ribs of the first supporting pattern.

5. A cartridge comprising:
a body having a first surface and a second surface different from the first surface and opposite the first surface, the first surface being configured to seat at least a portion of a first battery cell;
a first supporting pattern disposed in a first area along an edge of the first surface of the body and corresponding to a gas pocket of the first battery cell;
a second supporting pattern formed in a second area along an edge of the second surface of the body and corresponding to a gas pocket of the second battery cell, the second surface being configured to seat at least a portion of a second battery cell, the second supporting pattern including a plurality of second supporting ribs, each second supporting rib having a wall shape that protrudes downward from the second surface of the body;
a first needle with a tip facing from the first surface toward the first battery cell in an area where the first supporting pattern is disposed; and
a second needle with a tip facing from the second surface toward the second battery cell in an area where the second supporting pattern is disposed, the second needle facing in an opposite direction to the first needle.

6. A battery module comprising:
a plurality of stacked cartridges according to claim 1; and
a plurality of first battery cells seated in each cartridge.

7. The battery module according to claim 6, wherein each gas balancing passage runs in a thickness-wise direction of the body from a point in the first area where the first supporting pattern is disposed.

8. The battery module according to claim 6, further comprising at least one second battery cell,
wherein at least one cartridge of the plurality of cartridges further comprises a second supporting pattern formed in a second area along an edge of the second surface of the body and corresponding to a gas pocket of the at least one second battery cell.

9. The battery module according to claim 8, wherein the second supporting pattern includes a plurality of second supporting ribs, each second supporting rib having a wall shape that protrudes from the second surface of the body.

10. The cartridge according to claim 1, further comprising:
a needle with a tip facing from the first surface toward the first battery cell in an area where the first supporting pattern is disposed.

* * * * *